(12) United States Patent
Chaki et al.

(10) Patent No.: US 6,236,403 B1
(45) Date of Patent: May 22, 2001

(54) MODELING AND DEFORMATION OF 3-DIMENSIONAL OBJECTS

(75) Inventors: Youichiro Chaki; Atsushi Nakamura; Hiroaki Chiyokura, all of Kanagawa (JP)

(73) Assignees: Ricoh Company, Ltd., Tokyo; Hiroaki Chiyokura, Fujisawa, both of (JP)

(*) Notice: Subject to any disclaimer, the term of this patent is extended or adjusted under 35 U.S.C. 154(b) by 0 days.

(21) Appl. No.: 09/192,367

(22) Filed: Nov. 16, 1998

(30) Foreign Application Priority Data

Nov. 17, 1997 (JP) .................................... 9-314697

(51) Int. Cl.$^7$ .................................................. G06T 17/00
(52) U.S. Cl. ......................... 345/420; 345/419; 345/433
(58) Field of Search .................................... 345/419, 424, 345/425, 433, 434, 435, 438, 420

(56) References Cited

U.S. PATENT DOCUMENTS

| | | | | |
|---|---|---|---|---|
| 5,748,197 | * | 5/1998 | Guibas et al. | 345/438 |
| 5,751,852 | * | 5/1998 | Marimont et al. | 382/180 |
| 5,796,400 | * | 8/1998 | Atkinson et al. | 345/433 |
| 5,809,179 | * | 9/1998 | Marimont et al. | 382/254 |
| 6,014,143 | * | 1/2000 | Naqvi et al. | 345/424 |

* cited by examiner

*Primary Examiner*—Cliff N. Vo
(74) *Attorney, Agent, or Firm*—Oblon, Spivak, McClelland, Maier & Neustadt, P.C.

(57) ABSTRACT

A method of modeling a 3-dimensional object including performing one of a rounding operation generating the 3-dimensional object from a control grid and an inverse rounding operation generating a control grid from the 3-dimensional object depending on which one of the control grid and the 3-dimensional object is newly provided, the control grid including a plurality of edges and a plurality of vertexes, the 3-dimensional object including a plurality of boundary curves and a plurality of curved surfaces deforming the control grid by shifting the plurality of vertexes, performing the rounding operation when the control grid is deformed so as to introduce the deformation of the control grid to the 3-dimensional object, attaching a weight to one of the plurality of vertexes of the control grid to deform a corresponding one of the plurality of curved surfaces of the 3-dimensional object, attaching a weight to one of the plurality of edges of the control grid to deform a corresponding one of the plurality of boundary curves of the 3-dimensional object, and attaching information on a respective weight to a corresponding one of the plurality of vertexes and the plurality of edges as an attribute thereof.

11 Claims, 9 Drawing Sheets

MODELING AND DEFORMATION OF 3-DIMENSIONAL OBJECTS

BACKGROUND OF THE INVENTION

1. Field of the Invention

The present invention relates to a method of modeling based on rounding and inverse-rounding of a 3-dimensional object, and, also, relates to a computer-readable memory medium having programs recorded therein for implementing the method of modeling.

2. Description of the Related Art

As we all know, speed at which computers can manipulate information has been increasing at a significant rate, and an ever greater data-processing power has been applied in many areas of technology. Among these, 3-dimensional CG (computer graphics) has become such a familiar technological area as can be found everywhere as in movies, televisions, games, etc. Recent CG images are created by using smooth curved surfaces, successfully representing such complex figures as human bodies and animal bodies. In video images using such a CG technique, not only a generation of 3-dimensional objects but also free deformation of these 3-dimensional objects is utilized, thereby adequately representing movement of these figures. When such a modeling scheme based on smooth curved surfaces is to be used, it should be insured that flexibly manipulable deformation is possible.

As a scheme to achieve flexibly manipulable deformation, a free-form-deform scheme (FFD) is well known. The FFD refers to a concept for representing global deformation of a shape such as extension, bending, and contortion in the 3-dimensional CG. In the FFD, a control grid is generated by arranging a plurality of control points at grid points to surround a 3-dimensional object, and, then, the generated control grid is deformed to change the shape of an interior parameter space. The deformation of the interior parameter space is mapped to the 3-dimensional object. Various researches have been done on this scheme, and the FFD has been employed in a large number of CG-animation generation systems.

The FFD scheme, however, suffers a limitation in flexibility of deformation control depending on the shapes of 3-dimensional objects. Against this background, other schemes have been presented with an aim of generating a control grid reflecting a shape of a 3-dimensional object so as to enhance the flexibility of deformation control. There are other problems, however, such as difficulties to define a control grid, a high computation cost, etc., which remain to be overcome.

Accordingly, there is a need for a method of modeling which achieves flexible deformation without incurring a high computation cost.

SUMMARY OF THE INVENTION

Accordingly, it is a general object of the present invention to provide a method of modeling which can satisfy the need described above.

It is another and more specific object to provide a method of modeling which achieves flexible deformation without incurring a high computation cost.

In order to achieve the above objects, the present invention presents a modeling method which defines an object shape directly based on a shape of a control grid, and introduces deformation by use of this control grid. This modeling method employs a process which is reverse to that of the FFD. Further, a scheme which generates free curved surfaces from a polyhedra via rounding deformation is employed in order to define the object shape from the control grid. This scheme can easily define a shape of a 3-dimensional object based on information on the control grid by using a simple algorithm, and does not involve costly calculation of a parameter space deformation.

The modeling method according to the present invention has the following advantages:
1) easy to perform local deformation;
2) easy to predict intuitively a transformed shape;
3) great latitude in the shape of the control grid; and
4) low computation costs.

An attempt to employ a method of generating free curved surfaces from a polyhedra by using rounding deformation for the purpose of shape deformation proves that such application of the method is useful. However, a shape cannot be manipulated until the control grid is generated, and this fact puts a limit to the scope in which the method is applicable. In addition, such problems as inability to directly deform a 3-dimensional object, inability to represent a vertex surrounded by discontinuous surfaces, etc., are present. The present invention makes it possible to automatically generate a control grid with respect to an object of any shape, thereby extending the applicability of the method to cover models of any shapes. Further, concepts such as weights, topological divisions, and reference edges are utilized to permit handling of geometrical shapes which could not be properly defined otherwise.

According to the present invention, a method of modeling a 3-dimensional object includes the steps of performing either a rounding operation generating a 3-dimensional object from a control grid or an inverse rounding operation generating a control grid from a 3-dimensional object depending which one of the control grid and the 3-dimensional object is newly provided, the control grid including edges and vertexes and the 3-dimensional object including boundary curves and curved surfaces, deforming the control grid by shifting the vertexes, performing the rounding operation when the control grid is deformed so as to introduce the deformation of the control grid to the 3-dimensional object, attaching a weight to one of the vertexes of the control grid to deform a corresponding one of the curved surfaces of the 3-dimensional object, attaching a weight to one of the edges of the control grid to deform a corresponding one of the boundary curves of the 3-dimensional object, and attaching information on the respective weight to a corresponding one of the vertexes and the edges as an attribute thereof.

According to one aspect of the present invention, the method described above is such that the step of attaching a weight to one of the vertexes results in a topological division of the corresponding one of the curved surfaces.

According to another aspect of the present invention, the method as described above is such that the step of performing the rounding operation refers to the respective attribute attached to the corresponding one of the vertexes and the edges when introducing the deformation of the control grid to the 3-dimensional object.

In the methods described above, attributes are attached to the control grid in relation to the rounding operation, thereby achieving more enhanced representation of shapes in the rounding operation and providing better matches between the rounding operation and an inverse-rounding operation. This allows handling of models in a generic manner.

According to another aspect of the present invention, the method as described above is such that the inverse-rounding operation comprises the steps of defining a vertex with respect to each loop of the 3-dimensional object, said each loop made up from the boundary curves, attaching the attribute to the vertex, and connecting the vertex of a given loop with the vertex of an adjacent loop to generate a straight-line edge therebetween.

In the method described above, a control grid can be generated from a 3-dimensional object of any shape. Also, data of the 3-dimensional object comprised of complex curved surfaces is converted and compressed into data of an object comprised of straight-line edges, thereby reducing the data-processing load.

According to another aspect of the present invention, the method as described above is such that the inverse-rounding operation comprises the steps of removing edges connected to a vertex of a loop when the loop corresponds to a curved surface having the topological division, and generating the control grid after the removal of the edges connected to the vertex.

In the method described above, since the control grid is generated after removing edges connected to the vertex of the loop having the topological division, reversibility is retained even when another rounding operation is performed.

According to another aspect of the present invention, the method as described above is such that the inverse-rounding operation comprises the steps of retaining a vertex and edges connected thereto in the control grid when generating the control grid if tangent planes are discontinuous at the vertex, and attaching a reference attribute to the edges connected to the vertex.

In the method described above, a sharp vertex of a 3-dimensional object, i.e., a vertex where curved surfaces meet in a discontinuous fashion, is retained as part of the control grid, and edges connected to the vertex are provided with the reference attribute. This makes it possible to maintain reversibility when the rounding operation is performed.

According to another aspect of the present invention, the method as described above is such that the inverse-rounding operation comprises the steps of converting a C loop into a P loop to generate the control grid when the 3-dimensional object including the C loop is provided, and attaching an attribute indicative of a relation between the loops to a vertex of the control grid when the vertex corresponds to the P loop to which the C loop belongs.

In the method described above, the inverse-rounding operation is applicable even when the 3-dimensional object includes a C loop, i.e., a surface with a hole.

According to another aspect of the present invention, a machine-readable medium has a program embodied therein for causing a computer to model a 3-dimensional object, wherein the program includes a code unit configured to perform a rounding operation generating a 3-dimensional object from a control grid, a code unit configured to perform an inverse rounding operation generating a control grid from a 3-dimensional object, a code unit configured to initiate either the rounding operation or the inverse rounding operation depending which one of the control grid and the 3-dimensional object is newly provided, the control grid including edges and vertexes and the 3-dimensional object including boundary curves and curved surfaces, a code unit configured to deform the control grid by shifting the vertexes, a code unit configured to initiate the rounding operation when the control grid is deformed so as to introduce the deformation of the control grid to the 3-dimensional object, a code unit configured to attach a weight to one of the vertexes of the control grid to deform a corresponding one of the curved surfaces of the 3-dimensional object, a code unit configured to attach a weight to one of the edges of the control grid to deform a corresponding one of the boundary curves of the 3-dimensional object, and a code unit configured to attach information on the respective weight to a corresponding one of the vertexes and the edges as an attribute thereof.

According to another aspect of the present invention, the machine-readable medium as described above is such that the code unit configured to perform an inverse-rounding operation includes a code unit configured to define a vertex with respect to each loop of the 3-dimensional object, said each loop made up from the boundary curves, a code unit configured to attach the attribute to the vertex, and a code unit configured to connect the vertex of a given loop with the vertex of an adjacent loop to generate a straight-line edge therebetween.

According to another aspect of the present invention, a device for modeling a 3-dimensional object includes means for performing a rounding operation generating a 3-dimensional object from a control grid, means for performing an inverse rounding operation generating a control grid from a 3-dimensional object, means for initiating either the rounding operation or the inverse rounding operation depending which one of the control grid and the 3-dimensional object is newly provided, the control grid including edges and vertexes and the 3-dimensional object including boundary curves and curved surfaces, means for deforming the control grid by shifting the vertexes, means for initiating the rounding operation when the control grid is deformed so as to introduce the deformation of the control grid to the 3-dimensional object, means for attaching a weight to one of the vertexes of the control grid to deform a corresponding one of the curved surfaces of the 3-dimensional object, means for attaching a weight to one of the edges of the control grid to deform a corresponding one of the boundary curves of the 3-dimensional object, and means for attaching information on the respective weight to a corresponding one of the vertexes and the edges as an attribute thereof.

According to another aspect of the present invention, the device as described above is such that the means for performing an inverse-rounding operation includes means for defining a vertex with respect to each loop of the 3-dimensional object, said each loop made up from the boundary curves, means for attaching the attribute to the vertex, and means for connecting the vertex of a given loop with the vertex of an adjacent loop to generate a straight-line edge therebetween.

Other objects and further features of the present invention will be apparent from the following detailed description when read in conjunction with the accompanying drawings.

DESCRIPTION OF THE PREFERRED EMBODIMENTS

Figure 1:
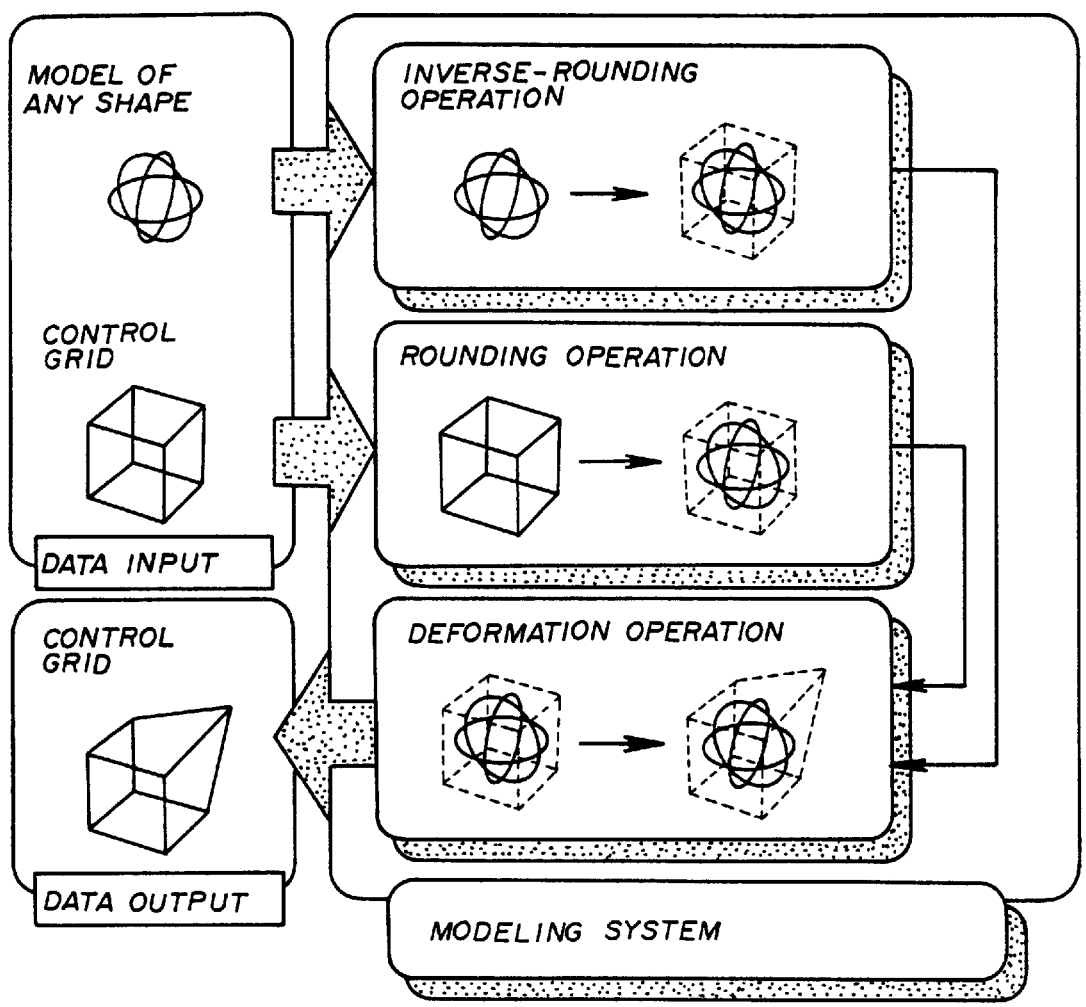
FIG. 1 is an illustrative drawing for explaining schematics of the present invention.

In the following, a schematic configuration of the system will be described first, and, then, a description will be given with regard to a rounding operation, an inverse-rounding operation, and a deformation. Further, an embodiment of the present invention will be described.

Free form deformation is a well-known method of effecting global deformation of a 3-dimensional object. In this method, a control grid surrounding a 3-dimensional object is defined, and, then, the defined control grid is deformed with respective displacements thereof being transferred to the 3-dimensional object, thereby effecting the deformation of the 3-dimensional object. This method, however, has problems in how to define the control grid, flexibility of the control, and the computation cost. In the present invention, a method of generating free curved surfaces based on a rounding operation is employed, and a polyhedra which serves as a basis for the curved-surface generation is used as a control grid for controlling deformation of a shape. This makes it possible to achieve flexible deformation without adding to the computation cost. An improvement is made on a conventional technique for the rounding operation, and topological division and weight allocation are introduced to enhance the manipulability of deformation. Further, an inverse-rounding operation is performed, making it possible to generate a control grid from a 3-dimensional object of any shape. This allows the method of the present invention to be applied to models of any shapes.

The present invention performs three main operations, i.e., the rounding operation, the inverse-rounding operation, and the deformation operation as part of the modeling process. The rounding operation generates a 3-dimensional object having free curved surfaces from a 3-dimensional object having only straight-line edges. Here, the generated object is subjected to deformation. The inverse-rounding operation generates a control grid comprised of straight-line edges from a 3-dimensional object having curved surfaces continuously connected with each other, such that the generated control grid contains therein the 3-dimensional object.

By performing the rounding operation and the inverse-rounding operation, links are established between the control grid and the 3-dimensional object, making possible to conduct a deformation operation. The deformation operation is generally performed on the control grid, and, in response, the 3-dimensional object is deformed accordingly.

In the following, the rounding operation, the inverse-rounding operation, and the deformation operation will be described in detail.

[Rounding Operation]

The rounding operation generates a 3-dimensional object to be deformed. When the rounding operation is carried out, an input object is defined as a control grid, and links are established between the control grid and a 3-dimensional object generated therefrom. Input to the rounding operation includes:

a control grid which is modeled by a user;

a control grid which is generated by the inverse-rounding operation; and a control grid which is deformed by the deformation operation.

The rounding operation is automatically performed in the system, so that the user does have to be conscious of the presence of the control grid, except for when the user himself/herself models the control grid and enters the same as input to the rounding operation.

[Inverse-Rounding Operation]

The inverse-rounding operation generates a control grid. When the inverse-rounding operation is carried out, a 3-dimensional input object is defined as an object to be transformed, and links are established between this object and a generated control grid. Input to the inverse-rounding operation includes:

a 3-dimensional object which is modeled by the user;

a solid mode of any kind, e.g., a model reconstructed based on data obtained from a measuring machine; and a 3-dimensional object which have lost links with a control grid during a process of deformation.

When the user himself/herself deforms the 3-dimensional object during the process of deformation operation, links vanish between the object and the control grid. When this happens, the system automatically performs the inverse-rounding operation.

[Deformation Operation]

The deformation operation can be carried out under the conditions that the control grid and the 3-dimensional object are linked together inside the system. Deformation is effected by shifting vertexes of the control grid. When the deformation operation is performed on the control grid, the system automatically attends to the rounding operation, thereby generating a new 3-dimensional object to be deformed. The rounding operation and the inverse-rounding operation are reverse to each other, so that only the information on the control grid may be stored when data after deformation needs to be stored. This can be seen as a function to compress data of a 3-dimensional object having complex curved surfaces to data of a 3-dimensional object comprised of only straight-line edges.

According to the present invention, a modeling procedure based on the above-described operations is as follows. A model which is created by the user, a solid model which is reconstructed from measured data, or the like is entered as input data. Next, a rounding operation or an inverse-rounding operation is performed to link the control grid with the 3-dimensional object to be deformed. Then, the deformation process is applied to deform the model. The model completed of deformation is stored by using the control-grid data.

FIG. 1 is an illustrative drawing for explaining schematics of the present invention.

The rounding operation serves to generate a 3-dimensional object from a control grid, such that the 3-dimensional object is comprised of smooth curved surfaces to be deformed. In the present invention, weight allocation and topological division further enhance the manipulability of the rounding operation. Also, detailed correspondences are established between the rounding operation and the inverse-rounding operation, which makes it possible to handle objects in a generic manner.

In what follows, an algorithm for generating a 3-dimensional object from a control grid will be described first. Then, a method of deforming the 3-dimensional object by allocating weights to vertexes of the control grid will be described. Finally, a description will be given with regard to how to handle a control grid which are provided with attributes for representing special geometric forms. Such attributes are introduced during the inverse-rounding operation.

[Generation of Object from Control Grid]

The rounding operation receives a control grid as input data thereto, and is performed by following the following processes.

Figure 2:
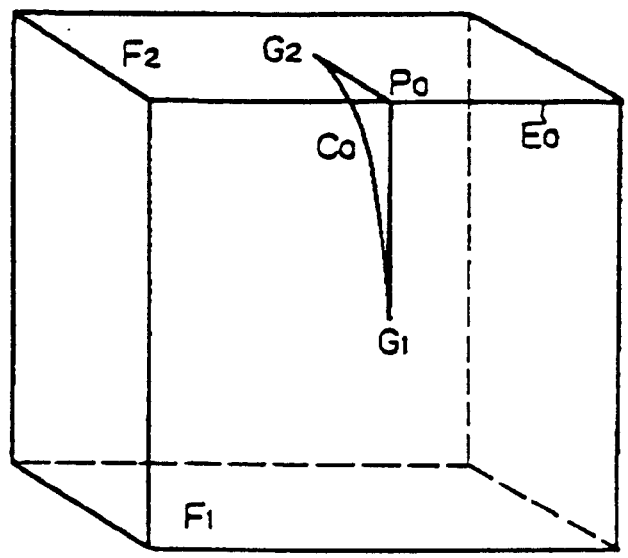
FIG. 2 is an illustrative drawing for explaining a method of generating boundary curves.

FIG. 2 is an illustrative drawing for explaining a method of generating boundary curves.

First, a single boundary curve is generated with respect to each of the edges of a control grid. In FIG. 2, an edge $E_0$ of a control grid is defined by two surfaces $F_1$ and $F_2$. A point $P_0$ is a midpoint of the edge $E_0$, and points $G_1$ and $G_2$ are a center point of the surfaces $F_1$ and $F_2$, respectively. Here, a center point of a surface is defined by a coordinate which is obtained by averaging coordinates of all the vertexes included in the surface. A boundary curve is defined as a second-order rational Bezier curve $C_0$ having $G_1, P_0$, and $G_2$ as control points. Here, use of a rational Bezier curve facilitates a flexible modeling based on weight allocation. The boundary curve has end points $G_1$ and $G_2$, tangent lines at which are $G_1P_0$ and $G_2P_0$, respectively. In general, each edge $E_i$ of the control grid has a curve (boundary curve) $C_i$ allocated thereto.

Figure 3:
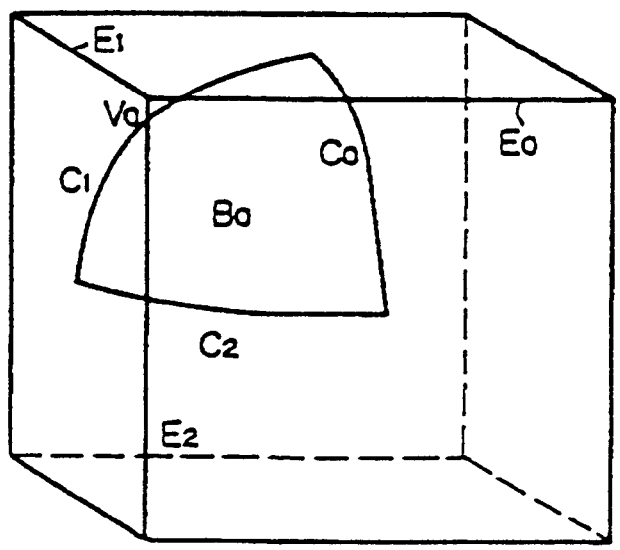
FIG. 3 is an illustrative drawing for explaining a method of generating a series of boundary curves.

FIG. 3 is an illustrative drawing for explaining a method of generating a series of boundary curves.

In FIG. 3, $V_0$ is a vertex of a control grid, and $E_0, E_1$, and $E_2$ are edges connected to the vertex $V_0$. With respect to edges $E_0, E_1$, and $E_2$, corresponding curves $C_0, C_1$, and $C_2$ are generated as described above, respectively. These curves together form a series $B_0$ of curves establishing a closed loop. In general, when a control grid has a vertex $V_i$ with an order of n, a curve series $B_i$ forming a closed loop is created by n curve lines, i.e., by n second-order rational Bezier curves $C_0$ through $C_{n-1}$. Here, an order of the vertex $V_i$ refers to the number of edges connected to the vertex $V_i$. Generation of a curve series is conducted with respect to each of the vertexes of the control grid, thereby defining a model which is used for creating a 3-dimensional free-curved-surface object to be deformed. Here, each vertex $V_i$ has a series $B_i$ of boundary curves forming a closed loop assigned thereto.

Based on the series of boundary curves as obtained above, a 3-dimensional free-curved-surface object is generated. The 3-dimensional free-curved-surface object is comprised of free curved surfaces smoothly connected together. To insure the smoothness, a surface with $G^1$ continuity must be generated between adjacent curved surfaces. Here, a surface with $G^1$ continuity is defined as a surface on which all points along a boundary curve between adjacent curved surfaces have tangent planes coinciding between the adjacent curved surfaces. In order to meet this requirement, a tangent plane must be shared at least at a point where no less than three boundary curves converge. A situation in which a tangent plane is shared (i.e., respective tangent plane coincide with each other) at a point where boundary curves meet can be equated to a situation in which tangent vectors at end points of boundary curves are contained in the same flat plane. Where the surfaces of a control grid are flat, tangent vectors at the endpoints of boundary curves reside on the surfaces of the control grid. In this case, therefore, respective tangent planes coincide with each other. Where the control grid has surfaces which are not flat, however, tangent planes at the endpoints of boundary curves do not coincide. In this case, an average normal vector n is obtained with respect to a given surface, and, then, a flat plane F is created so as to contain the center point of the given surface therein and extend perpendicularly to the normal vector n. A control point of a boundary curve having an endpoint at the center point is then projected onto the plane F so as to match a tangent plane to the plane F.

Finally, free curved surfaces are generated from the series of boundary curves for the purpose of interpolation. In general, the Bezier curved surface, the Coons curves surface, or the NURBS curved surface is typically used as a free curved surface. Since these curved surfaces are difficult to maintain $G^1$ continuity between all curved surfaces, however, the Gregory patch is employed in the present invention. The Gregory patch is described in Hiroaki Chiyokura et al., "Basics and Applications of 3-Dimensional CAD", Kyoritu Publisher, 1991, the contents of which are hereby incorporated by reference. This curved surface has such a correction characteristic that continuity between curved surfaces is easy to maintain through local adjustment of parameters.

[Deformation by Allocation of Weight to Vertex]

In the rounding operation, allocation of weights to vertexes achieves deformation of boundary curves and curved surfaces of a 3-dimensional object. There are two types vertexes to which weights can be allocated, one being original vertexes of the control grid and the other being vertexes generated at midpoints of edges of the control grid during the process of the rounding operation. When weights are allocated to the vertexes generated at the midpoints of the control-grid edges, these weights are regarded as weights allocated to corresponding boundary curves of the 3-dimensional object to be deformed. In doing so, edges which are deformed by allocation of weights are provided with attributes for the purpose of maintaining correspondences with the inverse-rounding operation.

Figure 4:
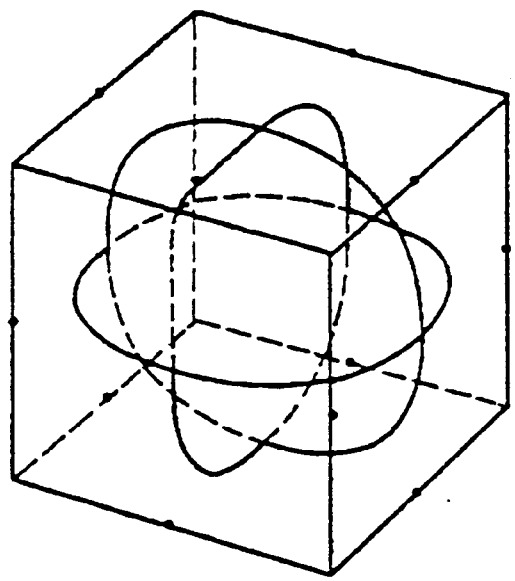
FIG. 4 is an illustrative drawing showing an example in which weights are allocated to boundary curves.

FIG. 4 is an illustrative drawing showing an example in which weights are allocated to boundary curves. Bringing a given weight to infinity makes a corresponding portion of the 3-dimensional object coincide with that portion of control grid.

Figure 5:
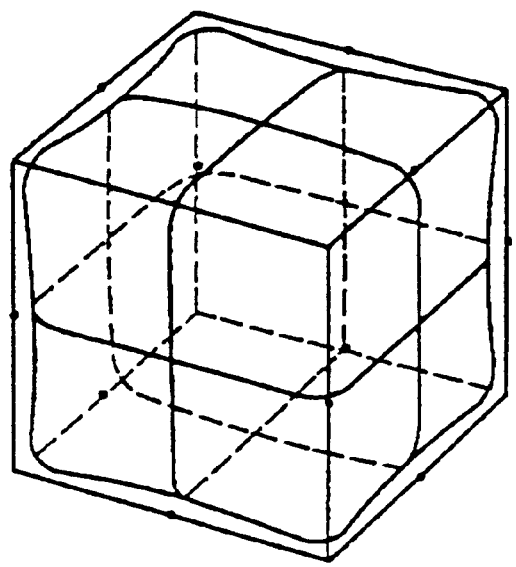
FIG. 5 is an illustrative drawing showing an example in which weights are allocated to all vertexes.

When a weight is given to a certain original vertex of the control grid, a free curved surface corresponding to this vertex is divided, and a vertex generated upon the division is shifted in accordance with the weight. Information on the weight and the division of the surface is attached to the newly generated vertex as attributes. This information is referred to when the inverse-rounding operation is performed. FIG. 5 is an illustrative drawing showing an example in which weights are allocated to all the vertexes.

[Correspondence with Inverse-Rounding Operation]

The inverse-rounding operation receives as input thereto a 3-dimensional object as follows.

a 3-dimensional object comprised of curved surfaces failing to satisfy $G^1$ continuity for connection therebetween;

a 3-dimensional object having a closed loop which is broken down to smaller loops;

a 3-dimensional object having a C loop.

A basic algorithm of the rounding operation alone cannot generate and represent a 3-dimensional object as listed above. In consideration of this, correspondences are established with the inverse-rounding operation in order to represent such objects.

[Non-$G^1$-Continuity Connection of Curved Surfaces]

A control grid generated from the inverse-rounding operation may be provided with an attribute which indicates non-$G_1$-continuity connections between curved surfaces. In such a case, if only the basic algorithm is used for generating a 3-dimensional object, all the surfaces are erroneously connected with $G^1$ continuity. To avoid this, attributes attached to edges of the control grid are read before generating a 3-dimensional object by use of the basic algorithm. These attributes are called reference attributes, and indicate that the edges be treated as reference edges. Reference edges are not used as edges of the control grid during the process of the rounding operation. When there are reference edges, a center point of a loop and a midpoint of an edge are defined inside the system as follows.

Figure 6:
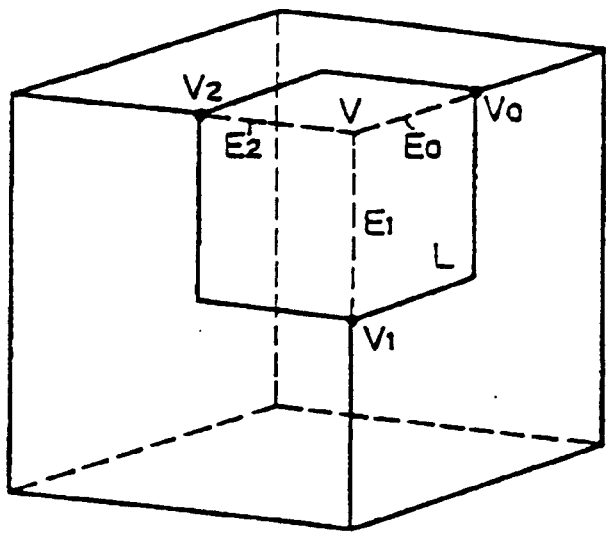
FIG. 6 is an illustrative drawing for explaining a control grid which has reference edges.

FIG. 6 is an illustrative drawing for explaining a control grid which has reference edges.

In the figure, reference edges are shown as $E_0$, $E_1$, and $E_2$, and a vertex connected only to these reference edges is denoted as V. A loop L is defined by edges which are generated by removing the vertex V and the reference edges $E_0$, $E_1$, and $E_2$. Here, the position of V is defined as the center point of the loop L. Further, vertexes positioned at endpoints of the edges $E_0$, $E_1$, and $E_2$ opposite to the vertex V are referred to as $V_0$, $V_1$, and $V_2$. Edges constituting the loop L connected to a given one of the vertexes $V_0$, $V_1$, and $V_2$ are regarded as one edge, and the given one of the vertexes $V_0$, $V_1$, and $V_2$ defines a midpoint of this edge. After this, the basic algorithm is applied to perform the rounding operation. This achieves accurate correspondences between the rounding operation and the inverse-rounding operation.

[Divided Loop]

When a vertex of a control grid is provided with a weight, and an inverse-rounding operation is applied to the 3-dimensional object generated by a rounding operation, the weight and the division of the loop are not reflected when the control grid obtained by this inverse-rounding operation is subjected to another rounding operation. To avoid this, information about the weight and the division attached to the vertex of the original control grid is referred to after the basic algorithm generates a 3-dimensional object, so that the loop is broken down, and a vertex generated upon this is shifted in accordance with the weight.

[C Loop]

The C loop is a topological element for representing a hole on a surface. In contrast, normal surfaces are referred to as P loops. A C loop always belongs to a P loop, forming a parent-child relationship. When there is a need to generate a C loop in a 3-dimensional object by a rounding operation, an attribute is attached to a vertex. After the generation of the 3-dimensional object by the basic algorithm, the attribute is referred to so as to generate a C loop.

By performing a reverse process to the rounding operation, an inverse-rounding operation serves to generate a control grid, comprised of only straight-line edges, from a 3-dimensional object comprised of curved surfaces connected with continuity. Use of this makes it possible to attend to flexible deformation of an object of any shape by applying a control grid.

In order to expand the extent to which generic treatment of objects are possible, accurate correspondences are provided between the rounding operation and the inverse-rounding operation. Information on weights and topological divisions introduced during the rounding operation is preserved as attribute information attached to topological elements of the control grid, and is referred to during a subsequent rounding operation. When a 3-dimensional object has a C loop or a vertex having a discontinuous connection with a surrounding loop, attribute information is attached to topological elements of the control grid to reflect this fact, thereby insuring reversibility of the rounding operation.

[Generation of Control Grid from Curved Surfaces]

Generation of a control grid is conducted by defining a vertex with respect to each loop of a 3-dimensional object, attaching necessary attributes to defined vertexes, and generating edges connecting the vertexes. In the following, a basic procedure for generating a control grid from curved surfaces will be shown.

[Defining Vertex]

Figure 7:
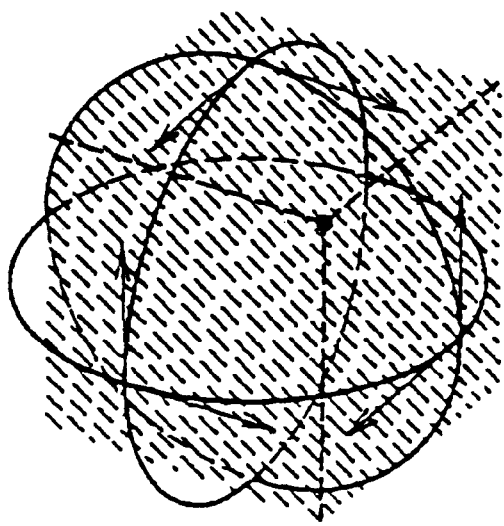
FIG. 7 is an illustrative drawing schematically showing definition of vertexes.

FIG. 7 is an illustrative drawing schematically showing definition of vertexes. As shown in the figure, vertexes of a control grid are defined with respect to respective loops of the 3-dimensional object. First, two edges connected to a certain vertex of a given loop are considered, and, then, a first-order derivation vector is obtained with respect to each of these two edges at the endpoint thereof, thereby providing a tangent plane at the position of this vertex. Tangent planes obtained in the like manner are examined to obtain interference points therebetween, which are defined as vertexes of the control grid. If a plurality of conflicting interference points are obtained, an average thereof is obtained. If no interference point is found as in the case where tangent planes coincide or where only an interference line can be detected, a point is defined by averaging the vertexes of the loop and control points of the boundary curves, and is projected onto the interfering element, thereby defining a vertex of the control grid.

[Attaching of Attribute]

Such attributes as color, texture, etc., provided for a loop are attached to a control grid, and are preserved even after deformation based on the rounding operation is performed. By the same token, information regarding weights and topological divisions introduced during the rounding operation is also preserved as attributes.

[Generation of Edges]

Figure 8:
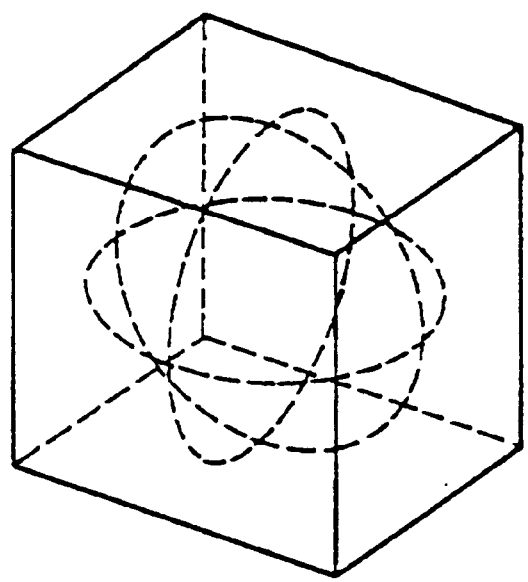
FIG. 8 is an illustrative drawing showing a 3-dimensional object and a control grid generated therefrom.

After all vertexes are defined, the vertexes are connected by straight lines between adjacent loops to generate straight-line edges. Namely, the edges of the control grid are generated so as to cross the edges of the 3-dimensional object. An object defined by these generated edges is the control grid. FIG. 8 is an illustrative drawing showing a 3-dimensional object and a control grid generated therefrom.

[Representation of Special Forms]

The inverse-rounding algorithm described above is based on an assumption that it is applied to 3-dimensional objects having no C loop and T node (e.g., a vertex to which three edges are connected with two of them being continuous to each other) and having all the surfaces connected with $G^1$ continuity. There is a need for an algorithm for an inverse-rounding operation, however, which can cope with a 3-dimensional object not satisfying these conditions, and, at the same time, can retain reversible characteristics with respect to the rounding operation. In the following, handling of such cases will be described.

[Topologically Divided Loop]

Figure 9:
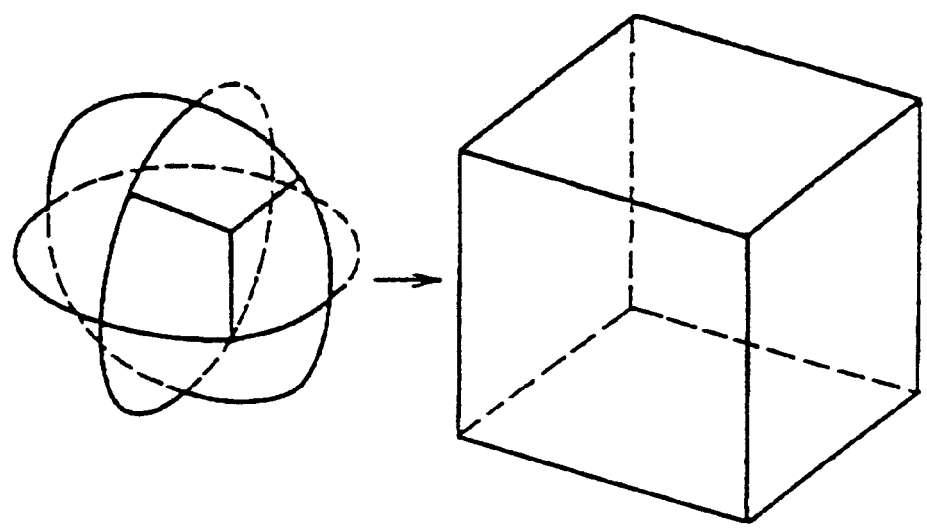
FIG. 9 is an illustrative drawing showing an example in which a control grid is generated from a 3-dimensional object having a topologically divided loop.

A topologically divided loop is generated by allocation of weights during the rounding operation. When a control grid is to be generated, vertexes having attributes attached thereto are checked first, and, then, edges connected to these vertexes are removed before the generation of the control grid. A vertex of a control grid corresponding to a topologically divided loop has attribute information attached thereto, thereby insuring reversibility when another rounding operation is performed. FIG. 9 is an illustrative drawing showing an example in which a control grid is generated from a 3-dimensional object having a topologically divided loop.

[Discontinuous Part of Curved Surface Connection]

When a 3-dimensional object having vertexes at which tangent planes are not continuous, e.g., a cylinder-shape object or a corn-shape object, is subjected to a straightforward inverse-rounding operation, the control grid generated by the operation does not sufficiently reflect geometrical features of the 3-dimensional object. Also, a 3-dimensional object created from this control grid via a rounding operation ends up having all the surfaces thereof connected with $G^1$ continuity. In this situation, the original 3-dimensional object has been lost. In order to avoid this, a sharp vertex of a 3-dimensional object is retained in the control grid, and edges connected to this vertex are provided with reference attributes. During a rounding operation, the reference attributes are referred to, thereby maintaining reversibility.

Figure 10:
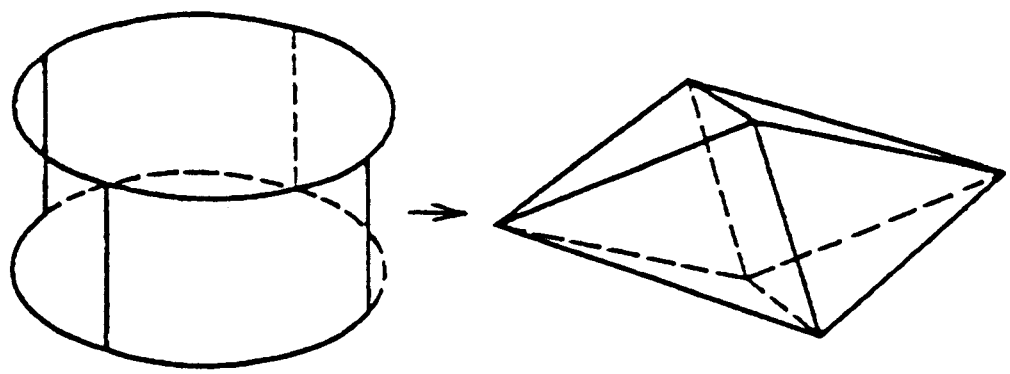
FIG. 10 is an illustrative drawing showing an example in which a control grid is generated from a cylinder by using a straightforward inverse-rounding operation.
Figure 11:
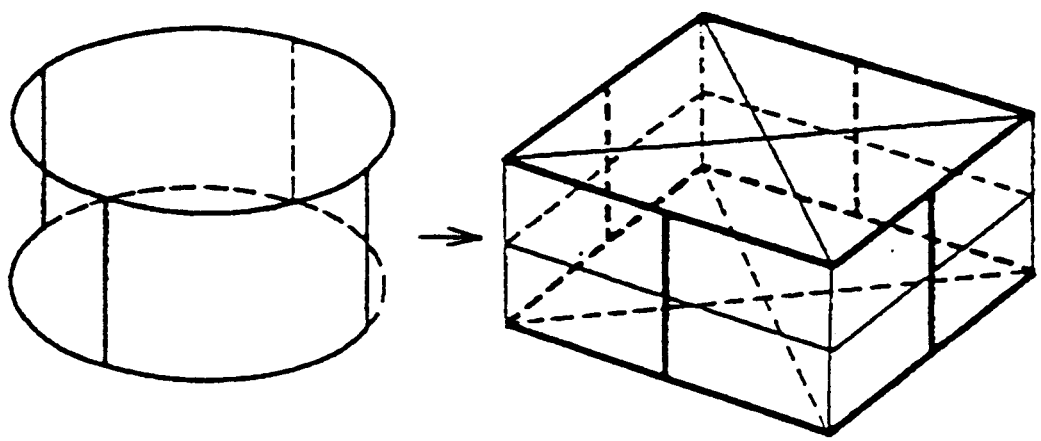
FIG. 11 is an illustrative drawing showing an example in which a control grid is generated by using reference attributes.

FIG. 10 is an illustrative drawing showing an example in which a control grid is generated from a cylinder by using a straightforward inverse-rounding operation. FIG. 11 is an illustrative drawing showing an example in which a control grid is generated by using reference attributes as described above. In FIG. 11, edges shown by thicker lines are provided with reference attributes.

[C Loop]

A C loop is first converted into a P loop, and, then, the basic algorithm is applied to generate a control grid. After the control grid is generated, a vertex of the control grid corresponding to a surface of a P loop which is a parent of a C loop is provided with an attribute specifying a relation between the loops. This makes it possible to handle a 3-dimensional object having a C loop in the inverse-rounding operation.

The deformation operation serves to deform a shape of a 3-dimensional object by shifting vertexes of a control grid. This operation can be carried out under the conditions that the control grid and the 3-dimensional object form a pair. When vertexes of the control grid are shifted, a rounding operation is automatically applied to the deformed control grid. In doing so, a curved surface is regenerated with respect to a given loop of a 3-dimensional object only when this loop has experienced a deformation changing the shape of the boundary curves. Because of this, the deformation operation does not have such a global effect as would propagate through the entirety of the 3-dimensional object.

Figure 12A:
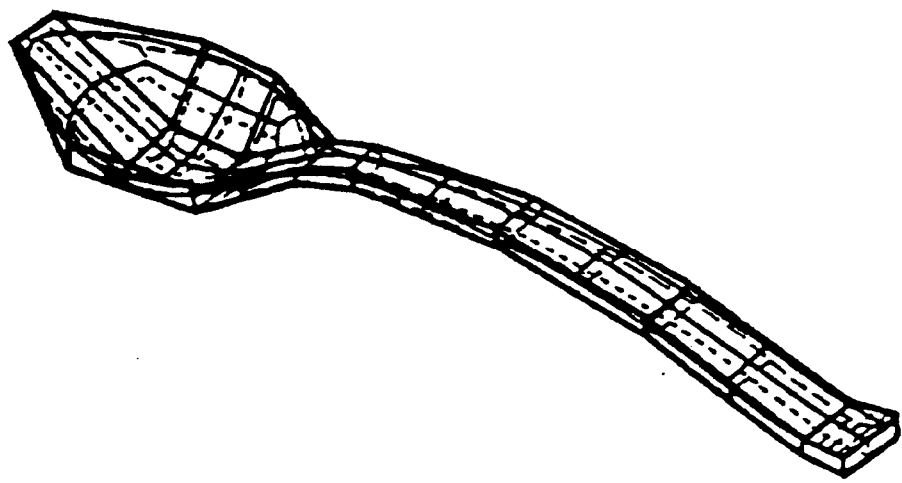
FIGS. 12A and 12B are illustrative drawings showing an example in which a 3-dimensional object is deformed through the shifting of vertex positions in a control grid.
Figure 12B:
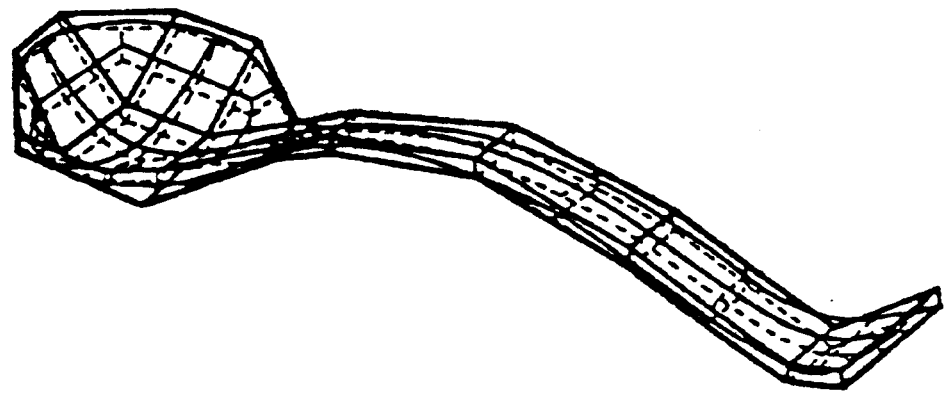

FIGS. 12A and 12B are illustrative drawings showing an example in which a 3-dimensional object is deformed through the shifting of vertex positions in a control grid. In each of the figures, a control grid is shown by thicker lines.

Figure 13:
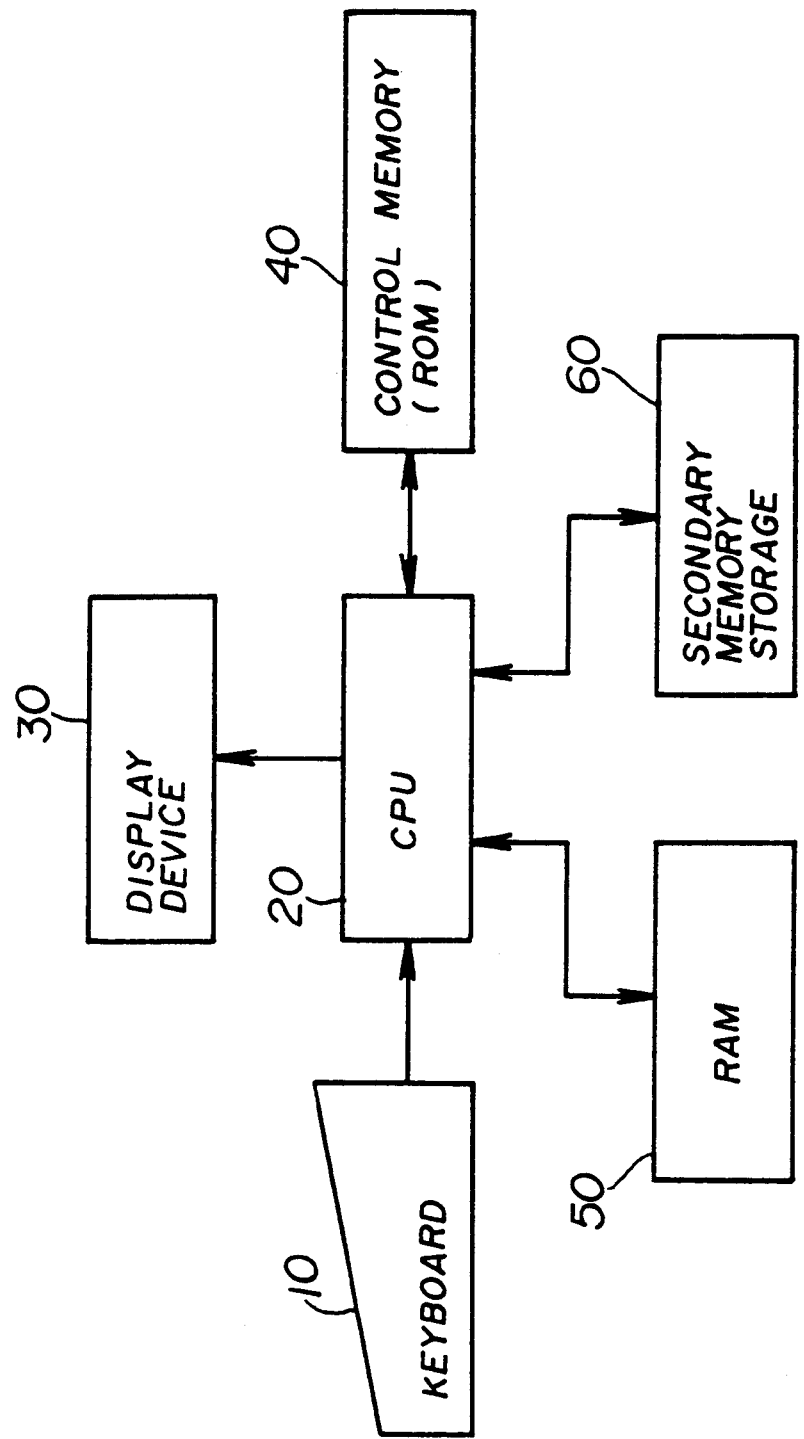
FIG. 13 is a block diagram showing an example of a device which performs a rounding operation and an inverse-rounding operation by use of a computer according to the present invention.

FIG. 13 is a block diagram showing an example of a device which performs the rounding operation and the inverse-rounding operation by use of a computer according to the present invention.

The device of FIG. 13 includes a keyboard 10, a CPU 20, a display device 30, a control memory 40, a RAM 50, and a secondary memory storage 60.

A user uses the keyboard 10 serving as an input means to enter data in the device. The data may include data defining a control grid of a 3-dimensional object to be deformed and/or data representing a 3-dimensional object to be deformed, where the latter data may represent a 3-dimensional shape created by the user or a solid model reconstructed from machine-measured data. The data may be stored in the RAM 50 or in the secondary memory storage 60, and loaded to the CPU 20. The user provides the CPU 20 with instructions regarding operations. The CPU 20 operates based on programs stored in the control memory (ROM) 40 to perform necessary steps of a rounding operation or an inverse-rounding operation with respect to the input data. Results of the operation are displayed by the display device 30.

Figure 14:
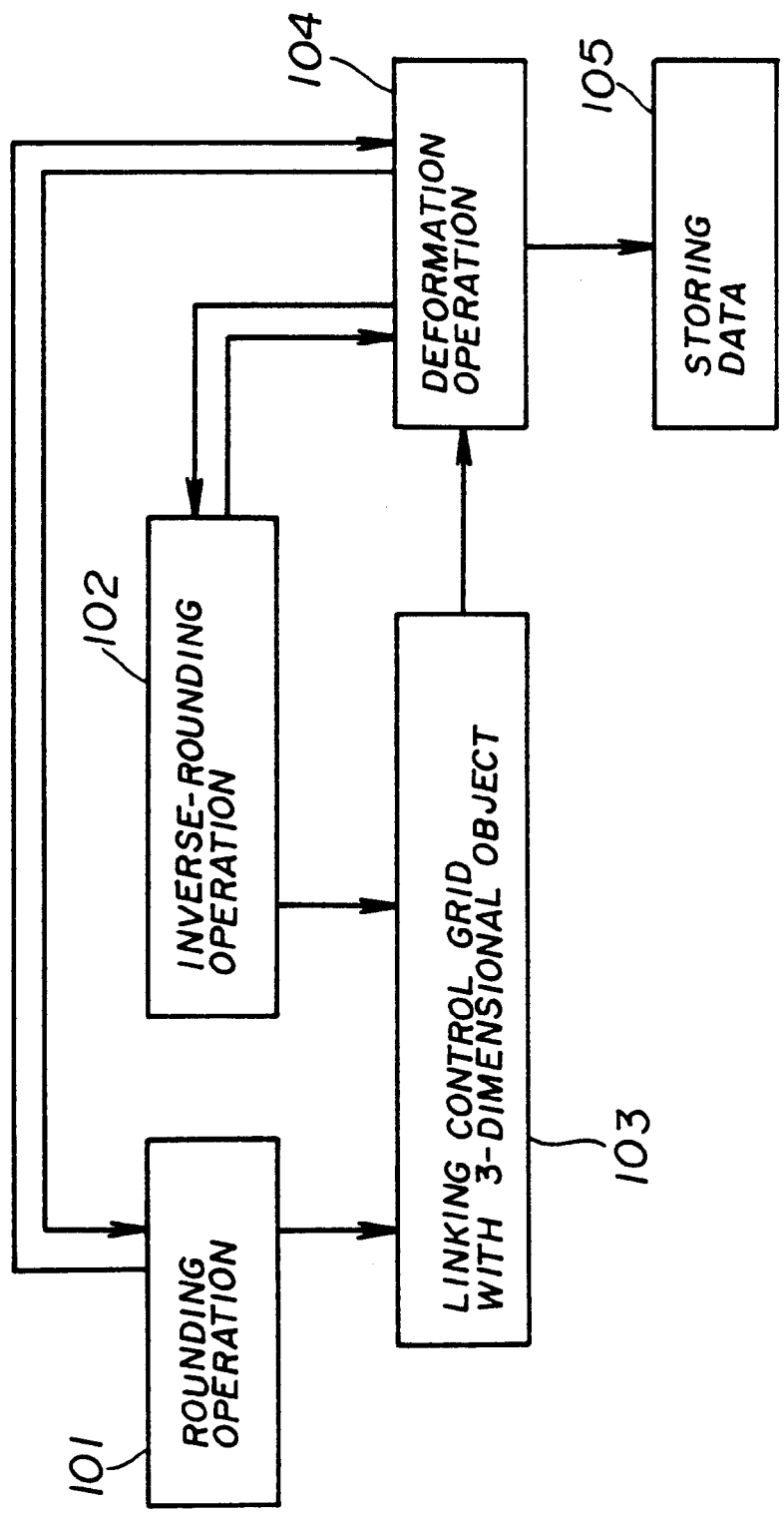
FIG. 14 is an illustrative drawing showing an operation flow of a modeling process based on the rounding operation and the inverse-rounding operation according to the present invention.

FIG. 14 is an illustrative drawing showing an operation flow of a modeling process based on the rounding operation and the inverse-rounding operation according to the present invention.

As described above, a 3-dimensional object created by a user or a solid model reconstructed from machine-read data is input to the device, for example. A rounding operation (101) or an inverse-rounding operation (102) is performed to establish links (103) between a control grid and a 3-dimensional object. Once links are established, a deformation operation (104) is carried out to deform the 3-dimensional object. Data obtained through the deformation operation is then stored (105).

Further, the present invention is not limited to these embodiments, but various variations and modifications may be made without departing from the scope of the present invention.

What is claimed is:

1. A method of modeling a 3-dimensional object, comprising the steps of:

performing one of a rounding operation generating the 3-dimensional object from a control grid and an inverse rounding operation generating a control grid from the 3-dimensional object depending on which one of the control grid and the 3-dimensional object is newly provided, the control grid including a plurality of edges and a plurality of vertexes, the 3-dimensional object including a plurality of boundary curves and a plurality of curved surfaces;

deforming the control grid by shifting the plurality of vertexes;

performing the rounding operation when the control grid is deformed so as to introduce the deformation of the control grid to the 3-dimensional object;

attaching a weight to one of the plurality of vertexes of the control grid to deform a corresponding one of the plurality of curved surfaces of the 3-dimensional object;

attaching a weight to one of the plurality of edges of the control grid to deform a corresponding one of the plurality of boundary curves of the 3-dimensional object; and attaching information on a respective weight to a corresponding one of the plurality of vertexes and the plurality of edges as an attribute thereof.

2. The method as claimed in claim 1, wherein said step of attaching a weight to one of the plurality of vertexes results in a topological division of the corresponding one of the plurality of curved surfaces.

3. The method as claimed in claim 1, wherein said step of performing the rounding operation refers to the attribute attached to the corresponding one of plurality of the vertexes and the plurality of edges when introducing the deformation of the control grid to the 3-dimensional object.

4. The method as claimed in claim 1, wherein said inverse-rounding operation comprises the steps of:
   defining a vertex with respect to each loop of the 3-dimensional object, said each loop made up from the plurality of boundary curves;
   attaching an attribute to the vertex; and
   connecting the vertex of a given loop with the vertex of an adjacent loop to generate a straight line edge therebetween.

5. The method as claimed in claim 2, wherein said inverse-rounding operation comprises the steps of:
   removing a plurality of edges connected to a vertex of a loop when the loop corresponds to a curved surface having the topological division; and
   generating the control grid after the removal of the plurality of edges connected to the vertex.

6. The method as claimed in claim 1, wherein said inverse-rounding operation comprises the steps of:
   retaining a vertex and a plurality of edges connected thereto in the control grid when generating the control grid if a plurality of tangent planes are discontinuous at the vertex; and
   attaching a reference attribute to the plurality of edges connected to the vertex.

7. The method as claimed in claim 1, wherein said inverse-rounding operation comprises the steps of:
   converting a C loop into a P loop to generate the control grid when the 3-dimensional object including the C loop is provided; and
   attaching an attribute indicative of a relation between the C and P loops to a vertex of the control grid when the vertex corresponds to the P loop to which the C loop belongs.

8. A program capable of being embodied in a machine-readable medium for causing a computer to model a 3-dimensional object, said program comprising:
   a code unit configured to perform a rounding operation generating the 3-dimensional object from a control grid;
   a code unit configured to perform an inverse rounding operation generating a control grid from the 3-dimensional object;
   a code unit configured to initiate one of the rounding operation and the inverse rounding operation depending on which one of the control grid and the 3-dimensional object is newly provided, the control grid including a plurality of edges and a plurality of vertexes, the 3-dimensional object including a plurality of boundary curves and a plurality of curved surfaces;
   a code unit configured to deform the control grid by shifting the plurality of vertexes;
   a code unit configured to initiate the rounding operation when the control grid is deformed so as to introduce the deformation of the control grid to the 3-dimensional object;
   a code unit configured to attach a weight to one of the plurality of vertexes of the control grid to deform a corresponding one of the plurality of curved surfaces of the 3-dimensional object;
   a code unit configured to attach a weight to one of the plurality of edges of the control grid to deform a corresponding one of the plurality of boundary curves of the 3-dimensional object; and
   a code unit configured to attach information on a respective weight to a corresponding one of the plurality of vertexes and the plurality of edges as an attribute thereof.

9. The program as claimed in claim 8, wherein said code unit configured to perform an inverse-rounding operation includes:
   a code unit configured to define a vertex with respect to each loop of the 3-dimensional object, said each loop made up from the plurality of boundary curves;
   a code unit configured to attach an attribute to the vertex; and
   a code unit configured to connect the vertex of a given loop with the vertex of an adjacent loop to generate a straight-line edge therebetween.

10. A device for modeling a 3-dimensional object, comprising:
    means for performing a rounding operation generating the 3-dimensional object from a control grid;
    means for performing an inverse rounding operation generating a control grid from the 3-dimensional object;
    means for initiating one of the rounding operation and the inverse rounding operation depending on which one of the control grid and the 3-dimensional object is newly provided, the control grid including a plurality of edges and a plurality of vertexes, the 3-dimensional object including a plurality of boundary curves and a plurality of curved surfaces;
    means for deforming the control grid by shifting the plurality of vertexes;
    means for initiating the rounding operation when the control grid is deformed so as to introduce the deformation of the control grid to the 3-dimensional object;
    means for attaching a weight to one of the plurality of vertexes of the control grid to deform a corresponding one of the plurality of curved surfaces of the 3-dimensional object;
    means for attaching a weight to one of the plurality of edges of the control grid to deform a corresponding one of the plurality of boundary curves of the 3-dimensional object; and
    means for attaching information on the weight to a corresponding one of the plurality of vertexes and the plurality of edges as an attribute thereof.

11. The device as claimed in claim 10, wherein said means for performing an inverse-rounding operation includes:
    means for defining a vertex with respect to each loop of the 3-dimensional object, said each loop made up from the plurality of boundary curves;
    means for attaching an attribute to the vertex; and
    means for connecting the vertex of a given loop with the vertex of an adjacent loop to generate a straight-line edge therebetween.

* * * * *